United States Patent [19]
Knapp

[11] Patent Number: 5,615,709
[45] Date of Patent: Apr. 1, 1997

[54] MIXER VALVE HAVING A BALL VALVE ELEMENT HOUSED IN A CARTRIDGE

[75] Inventor: Alfons Knapp, Biberach/Riss, Germany

[73] Assignee: Masco Corporation, Taylor, Mich.

[21] Appl. No.: 454,143

[22] PCT Filed: Dec. 11, 1992

[86] PCT No.: PCT/US92/10739

§ 371 Date: Jun. 9, 1995

§ 102(e) Date: Jun. 9, 1995

[87] PCT Pub. No.: WO94/13985

PCT Pub. Date: Jun. 23, 1994

[51] Int. Cl.[6] .................................. F16K 11/076
[52] U.S. Cl. .................................. 137/625.41; 137/636.3
[58] Field of Search .................. 137/625.17, 625.41, 137/636.3

[56] References Cited

U.S. PATENT DOCUMENTS

| | | | |
|---|---|---|---|
| 2,592,062 | 4/1952 | Perry | 137/625.41 |
| 3,915,195 | 10/1975 | Manoogian et al. | 137/625.41 |
| 4,043,359 | 8/1977 | Christo | 137/625.41 |
| 4,200,123 | 4/1980 | Brandelli | 137/625.4 |
| 4,305,419 | 12/1981 | Moen | 137/625.17 X |
| 4,352,369 | 10/1982 | Lorch | 137/625.41 X |
| 4,449,551 | 5/1984 | Lorch | 137/625.41 |
| 4,596,376 | 6/1986 | Knapp | 137/625.17 X |
| 4,941,509 | 7/1990 | Orlandi | 137/625.17 |
| 5,018,553 | 5/1991 | Grassberger et al. | 137/625.41 |
| 5,040,566 | 8/1991 | Orlandi | 137/625.41 |

FOREIGN PATENT DOCUMENTS 2705165  2/1976  Germany.

*Primary Examiner*—John Rivell
*Attorney, Agent, or Firm*—Reising, Ethington, Barnard & Perry

[57] ABSTRACT

A mixer valve (10) includes a valve housing (12) that mounts a cartridge (26). The cartridge (26) houses a ball valve element (24) that has its lower end exposed to cooperate with seal elements (25) about inlet ports (18) and (19). The ball valve element is vertically affixed within the cartridge housing (54) by a pin (60) extending through the ball valve element and having its distal ends (62) received in a pair of circumferentially extending slots (68).

32 Claims, 3 Drawing Sheets

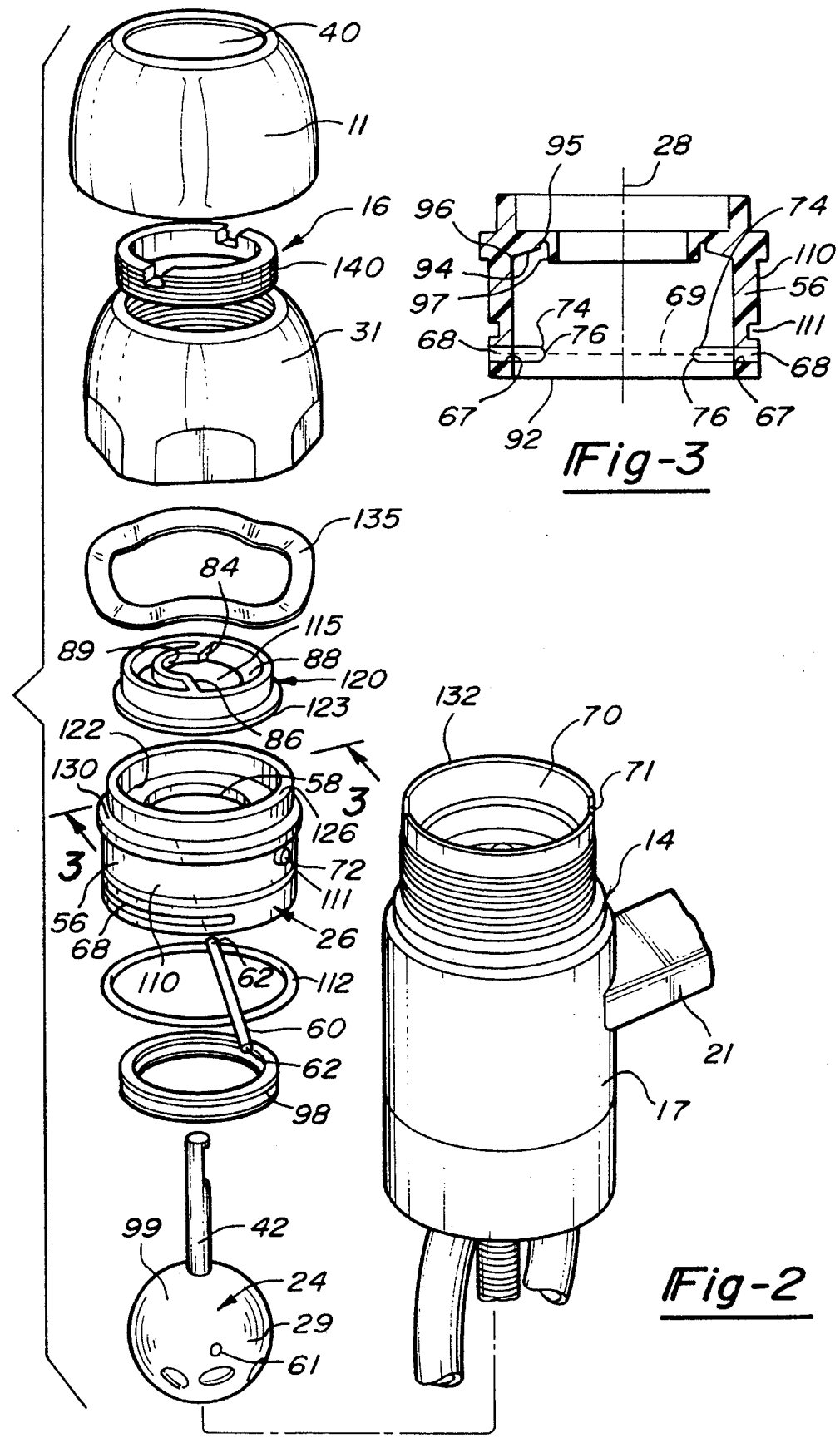

MIXER VALVE HAVING A BALL VALVE ELEMENT HOUSED IN A CARTRIDGE

TECHNICAL FIELD

The field of this invention relates to a mixer valve for a faucet incorporating a movable valve element housed in a cartridge and more particularly to a ball valve element housed in a cartridge.

BACKGROUND OF THE DISCLOSURE

Single handle faucets, commonly referred to as mixer valves, that control both hot and cold water flow have seen vast consumer acceptance. These faucets are commonly constructed such that a handle or knob is movable in two distinct directions to adjust the mix of hot and cold water and to adjust the volume or flow rate.

The two basic types of mixer valves that have seen widest commercial acceptance are plate valves and ball valves. While ball valves offer a reliable one piece construction that is durable and easily assembled, plate valves offer a drive mechanism that allows motion of the handle in two desirable directions that appears to be universally accepted by the consumer. This desirable handle motion allows for an orbiting motion of the handle about a fixed longitudinal axis of the valve body and a rocking, i.e. pivoting, motion about a movable horizontal axis relative to the valve body. The horizontal axis is fixed with respect to the handle and is perpendicular to the longitudinal axis of the valve body. The one distinguishing characteristic of this type of handle motion is that when the handle is pivoted to an off position, the desired mix ratio of hot and cold water can be remembered by the location of the handle so that when the faucet is turned back on, the same mix of hot and cold water flows through the faucet.

Recently, ball valves have been devised that allow the handle to be operated in the same fashion as the commercially accepted plate type mixer valve. These ball type mixer valves require the introduction of another moving part in the form of a rotatable plate mounted above the ball valve element. Furthermore, these ball valves have been combined with plate devices which can be adjustably positioned about a cover opening through which the handle controls the ball valve to limit the total flow rate. Alternately or in addition, these limiting devices limit the maximum ratio of hot water to cold water and consequentially the maximum temperature of the mixed water at the outlet.

Various disadvantages exist with a ball valve construction. In particular, the ball valve element is mounted between elastomeric inlet seals positioned about the inlet ports of the valve body and a sealing gasket that is mounted under the valve cover or cap. The elastomeric inlet seals and gasket are all yielding and render a floating characteristic to the ball valve element between the valve body and cap. There is no positive lock or locator mechanism that securely positions the ball valve in place. Because the ball valve can be moved in a translational manner against the elastomeric elements, the operator when operating the handle can also move the handle a small amount in any direction including directions not contemplated in the design of the mixing valve. This unwanted motion renders a undesirable spongy feel to the operation of the faucet and an uncertainty to the operator as to the proper operation of the faucet. Furthermore, the spongy feel of the handle gives the impression that the handle is unstable and not assembled properly.

The top sealing gasket provides three functions. Firstly, it seals against leakage of water about the ball. Secondly, its outer periphery seals against the inner surface of the housing to prevent leakage. Thirdly, the gasket resiliently positions the ball downwardly against the inlet seals. As a consequence, the gasket is an expensive component due to its mass and shape.

In order to reduce the floating feel, a regulation ring has been incorporated in many ball valve mixing valves. The regulation ring is adjustably screwed onto the valve cap. The regulation ring pushes the sealing gasket downward against the ball valve element which in turn is pressed against the inlet seals. The downward placement of the sealing gasket and ball valve element reduces the undesirable motion but does not eliminate it. Furthermore, the combining of the regulation ring with the known gasket increases the cost and complexity of the mixing valve.

Plate valves have often been incorporated into a cartridge format. The cartridge houses the movable and fixed plate. The cartridge can easily removed and replaced with another in order to effect an easy repair to the faucet. Ball valves have not been amenable to a faucet construction. Firstly, the floating nature of the traditional ball valve demanded that any cartridge completely surround and capture the ball valve, otherwise the ball valve will simply fall out of the bottom of the cartridge. Secondly, the compact nature of the ball valve construction leaves little room for the inclusion of a cartridge. The introduction of traditional cartridges that house and capture the ball into the faucet housing demands that the housing be made taller to incorporate the added height needed for the inclusion of the cartridge.

What is needed is a ball valve cartridge for a mixer valve that houses the upper sealing elements that seal against leakage to the exterior of the housing and seats a ball valve element. What is also needed is a ball valve cartridge that includes a ball valve element that duplicates the handle motion of known plate valves that provide for swinging of the handle about the longitudinal axis of the valve body while retaining the advantage of having only one movable piece to operate the valve, in other words, without the introduction of a separate moving part. What is also needed is a ball valve assembly that eliminates the need for a regulation ring and provides for a valve that eliminates the possibility of the handle moving in a fashion that is different from that needed for its proper operation.

SUMMARY OF THE DISCLOSURE

In accordance with one aspect of the invention, a mixer valve for liquids has a ball valve pivotably mounted in a valve receiving cavity of a housing. The cavity is in fluid communication with a plurality of inlet ports and at least one outlet port. The ball valve has at least a partially spherical surface and a plurality of inlet openings in its surface. The openings cooperate with the ports to control fluid flow through the ports. The valve housing has a control opening. The ball valve has a control stem passing through the control opening.

The mixer valve houses a cartridge housing. The cartridge housing member has an upper opening for allowing the control stem to pass therethrough. The ball valve is pivotably mounted to said cartridge housing. The cartridge has a lower opening through which said ball valve element protrudes to be cooperative with the inlet ports. The cartridge housing has a seal seat about the upper opening. A sealing gasket is seated in the seal seat about said upper opening in the cartridge housing and sealingly abuts against the ball valve element.

Preferably, the sealing gasket has a radially inwardly facing lip that sealingly abuts the ball valve element. It is desirable that the sealing gasket is preloaded such that the lip is biased against the ball valve element. The preload is preferably caused by the seal seat about the upper opening being canted with its inner periphery positioned above its outer periphery. The sealing gasket has an unloaded position in which its inner and outer periphery are approximately coplaner. The sealing gasket is preloaded by twisting said gasket inner such that its inner periphery is above its outer periphery and is seated in the canted seal seat.

In one embodiment, the cartridge housing has an outer sealing ring thereabout for preventing leakage between the cartridge and a valve body in which it is mounted.

In accordance with another aspect of the invention a ball valve cartridge for a mixer valve includes a ball valve element with at least one inlet and an outlet. A cartridge housing has an upper opening for allowing a control stem passing therethrough that is connectable to the ball valve. The ball valve is pivotably mounted to the cartridge housing. The cartridge has a lower opening through which the ball valve element protrudes. The ball valve element directly abuts inlet seal elements at the downstream end of inlet ports in the valve body.

In accordance with another aspect of the invention, a faucet mixer valve has a movable valve element mounted in a housing body that defines a cavity. The body has a plurality of inlet ports and an outlet port in fluid communication with the cavity. The movable valve element cooperates with the inlet ports to control liquid flow in both flow rate and temperature mix through the ports. The valve body has a control opening therethrough which receives a control stem connected to the movable valve element. The mixer valve is in cartridge form with a cartridge having a housing member and an upper opening for allowing the control stem to pass therethrough. The movable valve element is movably mounted to the cartridge housing member. The cartridge has a lower opening through which said movable valve element protrudes to be cooperative with the inlet ports.

In this fashion, a valve element is incorporated into a valve cartridge without necessitating an increase in the overall height of the valve body. Furthermore, the seals that prevent leakage about the movable valve element and cartridge can have a minimal size and weight because the seals no longer have the double function of biasing and positioning the movable valve element against the inlet seal elements.

BRIEF DESCRIPTION OF THE DRAWINGS

Reference now is made to the accompanying drawings in which:

FIG. 2 is an exploded perspective view of the mixer valve shown in FIG. 1;

FIG. 3 is a cross sectional view of the mixing valve lower body member taken along line 3—3 shown in FIG. 2;

DETAILED DESCRIPTION OF THE PREFERRED EMBODIMENT

Figure 1:
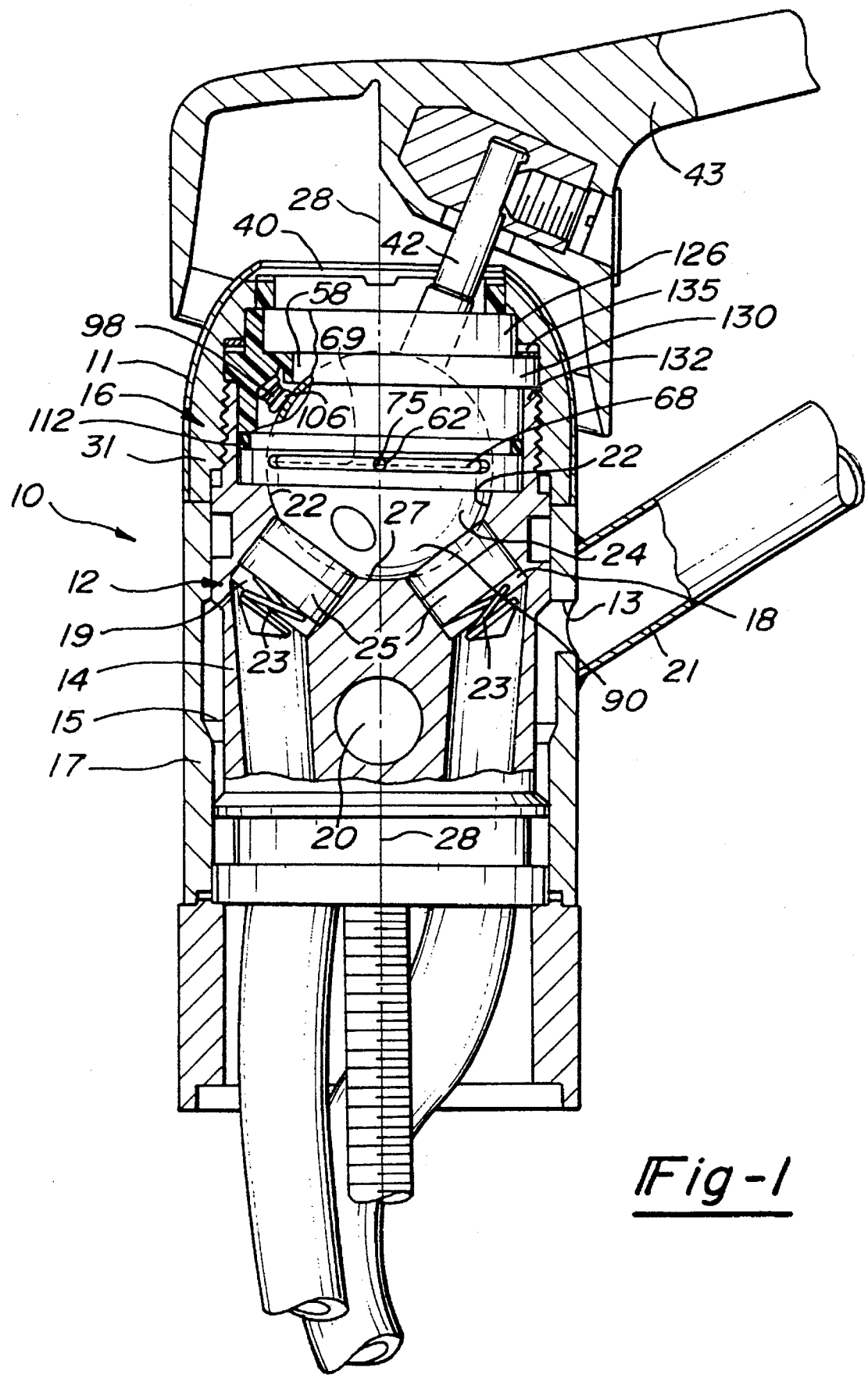
FIG. 1 is a side elevational and segmented view of a mixer valve illustrating one embodiment of the invention.
Figure 4:
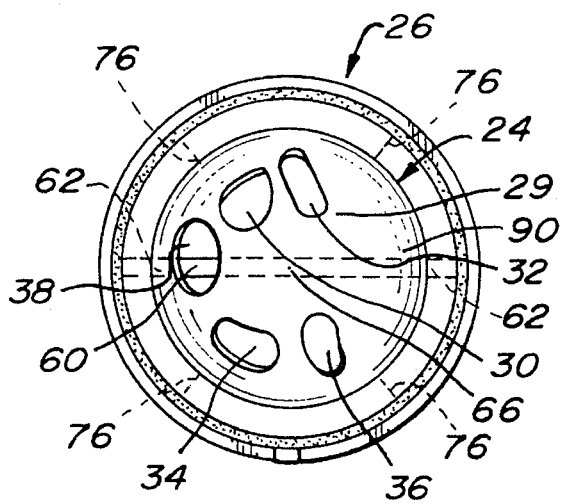
FIG. 4 is a bottom elevational view of the cartridge shown in FIG. 2.

Referring to FIGS. 1 and 2, a mixer valve 10 includes a valve housing 12 that is formed from a lower base member 14 and a cover assembly 16. The base member 14 has a cavity 22 formed therein with two inlet ports 18 and 19 for cold and hot water and has an outlet port 20 for the passage of mixed water in communication with cavity 22. The downstream ends of ports 18 and 19 are counter-bored to form a seat for two biasing springs 23 which bias tubular elastomeric sealing elements 25 against the ball valve element 24. The holes therethrough have a diameter of approximately 6.5 mm. The ports 18 and 19 have there downstream ends positioned at approximately 40° up from the bottom point 27 of cavity 22. Furthermore, the ports 18 and 19 are circumferentially positioned approximately 15° from the fore and aft plane as measured from the vertical axis 28.

A tubular shell 17 is sealingly and slidably mounted about the lower base member 14 and forms an annular chamber 15 in fluid communication with the outlet port 20. A spout 21 is affixed to the shell and in fluid communication with the annular chamber 15 through aperture 13 in shell 17.

The cover 16 includes a threaded member 31 that is screwed onto the base member 14. A cosmetic shell 11 is positioned over the member 31. The valve cavity 22 has a substantially semi-spherical lower surface sized to receive a ball valve element 24 that is housed in a cartridge 26. The cover 16 affixes the cartridge 26 in the cavity 22. The base member 14 has an upright collar flange 70 with a keyed slot 71 that receives a key 72 of cartridge 26 to correctly orient the cartridge in the mixer valve 10.

The ball valve element 24 has a substantially spherical valve surface 29 with cold inlet openings 30 and 32, hot inlet openings 34 and 36, and outlet opening 38 therethrough. The openings 30 and 32 cooperate with the cold inlet port 18, openings 34 and 36 cooperate with hot inlet port 19, and outlet opening 38 cooperates with outlet port 20 respectfully to regulate the passage of water from the two inlet ports 18 and 19 to the outlet port 20 by regulating the mixture ratio from the two inlet ports 18 and 19 and the flow rate, i.e. volume of total water per unit time.

The cover assembly 16 has a control opening 40 therethrough. The cover 16 is positioned such that the longitudinal axis 28 of the housing passes through the control opening 40. The cartridge 26 includes a housing member 56 that has an upper opening 58 aligned under opening 40.

A control stem 42 is fixedly connected to the ball valve element 24. A control stem 42 extends through the control opening 40. The control stem 42 is constructed to be attached to a faucet handle 43 in a conventional fashion.

The ball valve element 24 is pivotably mounted to the cartridge housing member 56. The housing member 56 may be manufactured from known plastic material suitable for faucet applications. The ball valve element 24 also has a cylindrical pin 60 extending therethrough with its distal ends 62 extending to the exterior of ball valve surface 29. Holes 61 are sized to slidably receive the pin 60. The pin 60 is positioned to intersect the center 66 of ball valve 24 and lie perpendicular to control stem 42. The pin can be welded in place as described in more detail later.

Each distal end 62 is positioned in a circumferentially disposed slot 68 formed in the cartridge housing 56. Each slot 68 has a central axis disposed in a plane 69 perpendicular to axis 28. Because the ends 62 are cylindrical in shape, they have a circular cross-section that allows them to pivot in slots 68 about an axis 75 that is perpendicular to axis 28.

The circumferential ends 74 of the slots 68 form stop shoulders 76 for the distal ends 62. The slots 68 are vertically dimensioned to form only enough clearance to allow sliding movement of the pin ends 62 in slot 68. Desirably no vertical spacing exists between slot 68 and the ends 62.

The ball valve element 24 has a lower section 90 of the valving surface 29 protruding through the large lower open end 92 of the cartridge housing 56. The protruding section 90 is a significant portion of the ball. Approximately just under hair of the spherical valving surface 29 protrudes under the cartridge lower opening 92 at any given time. The valving surface 29 with the openings 30, 32, 34, and 36 operably abuts the spring biased sealing elements 25.

Figure 6:
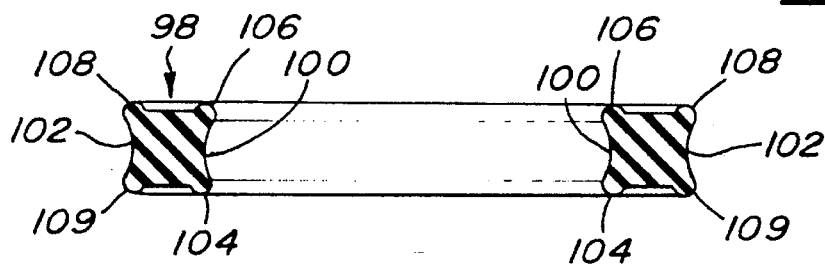
FIG. 6 is a cross-sectional view of the gasket shown in FIG. 1 in an unloaded condition.

An annular gasket seat 94 is positioned about the upper opening 58 and faces ball element 24. The gasket seat 94 is canted with its inner periphery 95 positioned higher than its outer periphery 96. A downwardly depending shoulder 97 vertically depends at the inner periphery. An annular gasket seal ring 98 is mounted in the cartridge housing 56 against the seat 94 such that it is placed under a preload with its inner periphery 100 twisted to be higher than its outer periphery 102. The gasket seal ring 98 has four rounded peripheral lip sections 104, 106, 108, and 109. One of the lips 104 abuts the ball valve element 24 and provides a seal therebetween against leakage of water. The upper lips 106 and 108 abut the canted seat 94 with inner lip 106 being positioned higher than outer lip 108. The gasket seal ring 98 is shown in FIG. 6 in the unloaded position with the lips 106 and 108 being horizontally aligned. The upper section 99 of ball surface 29 that abuts gasket seal ring 98 is properly polished to the appropriate smoothness to provide a proper seal with the gasket.

The outer periphery 110 of the cartridge housing 56 has an annular groove 111 which seats an O-ring 112. The O-ring 112 is sized to seal the cartridge outer periphery 110 with the cavity 22 in lower base member 14 of housing 12.

Rocking of the control stem along a lane containing the longitudinal axis 28 pivots the ball valve element 24 about the pivot axis 75 independently of the rotated position of the ball valve member about axis 28. Furthermore, the distal ends 62 may slide along slots 68 to allow the ball valve element 24 to rotate about axis 28 when the control stem 42 is swung about the longitudinal axis 28.

The rotation of the ball valve element 24 about axis 28 is limited by the position of the stop shoulders 76 that abut the distal ends 68. Mixer valves having different applications may have different rotation angles established by the circumferentially positioning of stop shoulders 76. The rotation of the ball valve element 24 as illustrated adjusts the ratio mix and thus the temperature of the discharged mixed water.

Figure 5:
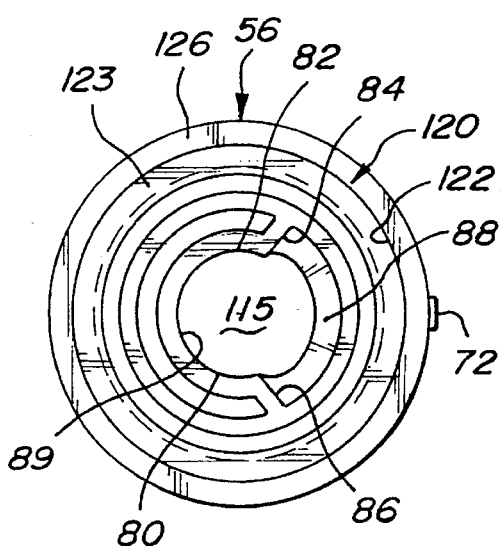
FIG. 5 is a top plan view of the cartridge housing shown in FIG. 2.

Alternately, or in addition to the stop shoulders 76, the rotation of the ball about axis 28 may also be limited by radially extending edges 80, 82, 84, and 86 of upper aperture 115 in guide template 120 that fits within upper recess 122 about aperture 58 in cartridge housing 56 as shown in FIG. 5. Recess 122 is surrounded by an annular retaining collar 126. The stem 42 when it abuts the edges 80–86 is prevented from further movement beyond the respective edges. Edges 80 and 82 define the cold limit and edges 84 and 86 define the hot limit. The edges 80–86 allow the ball to rotate about vertical axis 28 for approximately 90°.

The upper opening 58 also has circumferential edges 88 and 89 that control the extent of rocking motion about axis 75 of pin 60 from the off position to the full on position respectively.

The cartridge is assembled with the gaskets 98 and 112 properly seated. Ball 24 is then positioned against gasket 98 and slightly pressed to bias the gasket 98. The pin 60 is then passed through the slots 68 and holes 61 in ball surface 29. The bias of the gasket 98 onto the ball 24 provides a frictional fit of the pin ends 62 onto the lower surface 67 of each slot 68 that prevents the pin 60 from falling out. Template 120 is then placed in recess 122. The template 120 has an outer thin flange 123 that can be either press fitted or snap fitted in recess 122. The assembled cartridge 26 is a self contained assembly that can be sold separately as a repair replacement for later installation into the faucet mixer valve 10.

The assembled cartridge 26 is placed in cavity 22 of the faucet body 14. The slot 72 properly positions the cartridge 26 in the cavity and ledge 130 properly vertically positions the cartridge 26 on a corresponding ledge 132 in base member 14. Cover 16 is then threaded onto the upright flange 70 with a spring loaded corrugated ring 135 interposed between the cartridge 26 and cover 16 to downwardly bias the cartridge 26 against ledge 132.

The minimum clearance between ends 62 of pin 60 and slots 68 in the vertical direction prevents vertical displacement of the ball valve element 24 with respect to the valve housing 12 and cartridge housing 54. Consequently, the control stem does not show any instability or render a spongy feel to the operator when the ball is pivoted along its two prescribed pivotable directions.

The need for a large resilient biasing regulation ring intended to push down the ball 24 against the spring biased sealing elements 25 is eliminated. Gasket seal ring 98 functions solely to prevent leakage between the ball valve element 24 and cartridge housing 56. The O-ring 112 functions solely to prevent leakage between the cartridge housing 56 and lower base member 14. The vertical position of the ball valve element 24 is affixed within the cartridge housing 56 by the pin 60 and slots 68. Furthermore, any adjustment ring 140 member that has previously been needed to provide proper bias of the ball valve 24 against seal elements 25 becomes optional.

Furthermore, the ball valve element 24 is incorporated into an easily replaceable valve cartridge 26 without necessitating an increase in the overall height of the valve housing 12 as compared to prior art mixing valves incorporating ball valve elements. Furthermore, the cartridge is retrofittable or usable in the standard base 14 that has previously been fitted with ball valves found in the prior art if the ball valve has the properly designed inlets and outlet.

Variations and modifications are possible without departing from the scope and spirit of the present invention as defined by the appended claims.

The embodiments in which an exclusive property or privilege is claimed are defined as follows:

1. A ball valve cartridge for a mixer valve characterized by:
   a ball valve element having at least one inlet and an outlet;
   a cartridge housing having an upper opening for allowing a control stem passing therethrough to be connectable to said ball valve;
   means for seating said ball valve movably within said cartridge housing;
   said cartridge having a lower opening through which said ball valve element protrudes, said cartridge being removably installable in a cavity of said mixer valve as a single unit with said ball valve remaining interconnected with said cartridge housing, said ball valve element being seatable in proximity to inlet ports within said mixer valve below said cartridge such that its at least one inlet is selectively alignable or misalignable with said inlet port.

2. A ball valve cartridge characterized by:

a ball valve element having at least one inlet and an outlet;

a cartridge housing having an upper opening for allowing a control stem passing therethrough to be connectable to said ball valve;

means for seating said ball valve movably within said cartridge housing;

said cartridge having a lower opening through which said ball valve element protrudes, said ball valve element being seatable in proximity to inlet ports within said mixer valve below said cartridge such that its at least one inlet is selectively alignable or misalignable with said inlet port;

said means for seating said ball valve including protrusions extending from circumferentially opposite sides of said ball element engageable in at least one circumferentially extending slot within said cartridge.

3. A ball valve cartridge as defined in claim 2 further characterized by;

said protrusions formed by a pin extending through said ball valve.

4. A ball valve cartridge as defined in claim 3 further characterized by;

said cartridge housing having a seal seat about said upper opening;

a sealing gasket seated in said seal seat about said upper opening in said cartridge housing and sealingly abuttable against said ball valve element.

5. A ball valve cartridge as defined in claim 3 further characterized by;

a template member mounted in an upper recess in said cartridge housing in proximity to said upper aperture to limit rocking motion and orbiting motion of said stem.

6. A ball valve cartridge as defined in claim 4 further characterized by;

said sealing gasket having a radially inwardly facing lip that sealingly abuts said ball valve element.

7. A ball valve cartridge as defined in claim 6 further characterized by;

said sealing gasket being preloaded such that said lip is biased against said ball valve element.

8. A ball valve cartridge as defined in claim 7 further characterized by;

said pin having a frictional fir with a lower surface of said at least one circumferentially extending slot.

9. A ball valve cartridge as defined in claim 7 further characterized by;

said seal seat about said upper opening being canted with its inner periphery positioned above its outer periphery;

said sealing gasket having an unloaded position in which its inner and outer periphery are approximately coplaner; and said sealing gasket when preloaded is twisted such that said gasket inner periphery is above its outer periphery and being seated in said canted seal seat.

10. A ball valve cartridge as defined in claim 8 further characterized by;

said cartridge housing having an outer sealing ring thereabout for preventing leakage about said cartridge.

11. A ball valve cartridge as defined in claim 4 further characterized by;

said cartridge housing having an outer sealing ring thereabout for preventing leakage about said cartridge.

12. A ball valve cartridge as defined in claim 1 further characterized by;

said cartridge housing having a seal seat about said upper opening;

a sealing gasket seated in said seal seat about said upper opening in said cartridge housing and sealingly abuttable against said ball valve element.

13. A ball valve cartridge as defined in claim 10 further characterized by;

a template member mounted in an upper recess in said cartridge housing in proximity to said upper aperture to limit rocking motion and orbiting motion of said stem.

14. A ball valve cartridge as defined in claim 12 further characterized by;

said sealing gasket having a radially inwardly facing lip that sealingly abuts said ball valve element.

15. A ball valve cartridge as defined in claim 13 further characterized by;

said sealing gasket being preloaded such that said lip is biased against said ball valve element.

16. A ball valve cartridge as defined in claim 12 further characterized by;

said seal seat about said upper opening being canted with its inner periphery positioned above its outer periphery;

said sealing gasket having an unloaded position in which its inner and outer periphery are approximately coplaner; and said sealing gasket when preloaded is twisted such that said gasket inner periphery is above its outer periphery and being seated in said canted seal seat.

17. A ball valve cartridge as defined in claim 16 further characterized by;

said cartridge housing having an outer sealing ring thereabout for preventing leakage about said cartridge.

18. A ball valve cartridge as defined in claim 12 further characterized by;

said cartridge housing having an outer sealing ring thereabout for preventing leakage about said cartridge.

19. In a faucet mixer valve having a ball valve pivotably mounted in a housing body that defines a cavity, said body having a plurality of inlet ports and an outlet port in fluid communication with said cavity, said ball valve having plurality of openings in an outer partially spherical valve surface, said openings cooperating with said inlet ports to control liquid flow in both flow rate and temperature mix through said ports, said valve body including a cover member having a control opening therethrough, said ball valve having a control stem connected thereto and extending through said control opening, the improvement characterized by;

said mixer valve being in cartridge form with a cartridge having a housing member;

said valve cover of said valve body being separable from said housing member with maintaining the integrity of said cartridge;

said cartridge housing member having an upper opening for allowing said control stem passing therethrough;

means for seating said ball valve pivotably to said cartridge housing member;

said cartridge having a lower opening through which said ball valve element protrudes to be cooperative to said inlet ports;

said cartridge housing having a seal seat about said upper opening;

a sealing gasket sated in said seal seat about said upper opening in said cartridge housing and sealingly abuttable against said ball valve element; and said cartridge being removable from said valve body as a single unit after said valve cover is removed with said ball valve element remaining interconnected to said cartridge housing.

20. A faucet mixer valve as defined in claim 19 further characterized by;

a template member mounted in an upper recess in said cartridge housing in proximity to said upper aperture to limit rocking motion and orbiting motion of said stem.

21. A faucet mixer valve as defined in claim 19 further characterized by;

said sealing gasket having a radially inwardly facing lip that sealingly abuts said ball valve element.

22. A faucet mixer valve as defined in claim 21 further characterized by;

said sealing gasket being preloaded such that said lip is biased against said ball valve element.

23. A faucet mixer valve as defined in claim 22 further characterized by;

said seal seat about said upper opening being canted with its inner periphery positioned above its outer periphery;

said sealing gasket having an unloaded position in which its inner and outer periphery are approximately coplaner; and said sealing gasket when preloaded is twisted such that said gasket inner periphery is above its outer periphery and being seated in said canted seal seat.

24. A faucet mixer valve as defined in claim 19 further characterized by;

said means for seating said ball valve including protrusions extending from circumferentially opposite sides of said ball element engageable in at least one circumferentially extending slot within said cartridge.

25. A faucet mixer valve as defined in claim 24 further characterized by;

said protrusions formed by a pin extending through said ball valve.

26. A faucet mixer valve as defined in claim 25 further characterized by;

said sealing gasket having a radially inwardly facing lip that sealingly abuts said ball valve element.

27. A faucet mixer valve as defined in claim 26 further characterized by;

said sealing gasket being preloaded such that said lip is biased against said ball valve element.

28. A faucet mixer valve as defined in claim 27 further characterized by;

said pin having a frictional fit with a lower surface of said at least one circumferentially extending slot.

29. A faucet mixer valve as defined in claim 28 further characterized by;

said cartridge housing having an outer sealing ring thereabout for preventing leakage about said cartridge.

30. A faucet mixer valve as defined in claim 19 further characterized by;

said cartridge housing having an outer sealing ring thereabout for preventing leakage about said cartridge.

31. In a faucet mixer valve having a movable valve element mounted in a housing body that defines a cavity, said body having a plurality of inlet ports and an outlet port in fluid communication with said cavity, said movable valve element cooperating with said inlet ports to control liquid flow in both flow rate and temperature mix through said ports, said valve body having a control opening therethrough, said valve element having a control stem connected thereto and extending through said control opening, the improvement characterized by;

said mixer valve being in cartridge form with a cartridge having a housing member;

said cartridge housing member having an upper opening for allowing said control stem passing therethrough;

means for seating said movable valve element to said cartridge housing member;

said cartridge having a lower opening through which said movable valve element protrudes to be cooperative to said inlet ports;

said cartridge housing having a seal seat about said upper opening;

a sealing gasket seated in said seal seat about said upper opening in said cartridge housing and sealingly abuttable against said movable valve element.

32. A faucet mixer valve as defined in claim 31 further characterized by;

said cartridge housing having an outer sealing ring thereabout for preventing leakage about said cartridge.

* * * * *